Oct. 11, 1932.  V. A. HANSON  1,882,577
ARC LAMP CONSTRUCTION
Filed Dec. 3, 1930
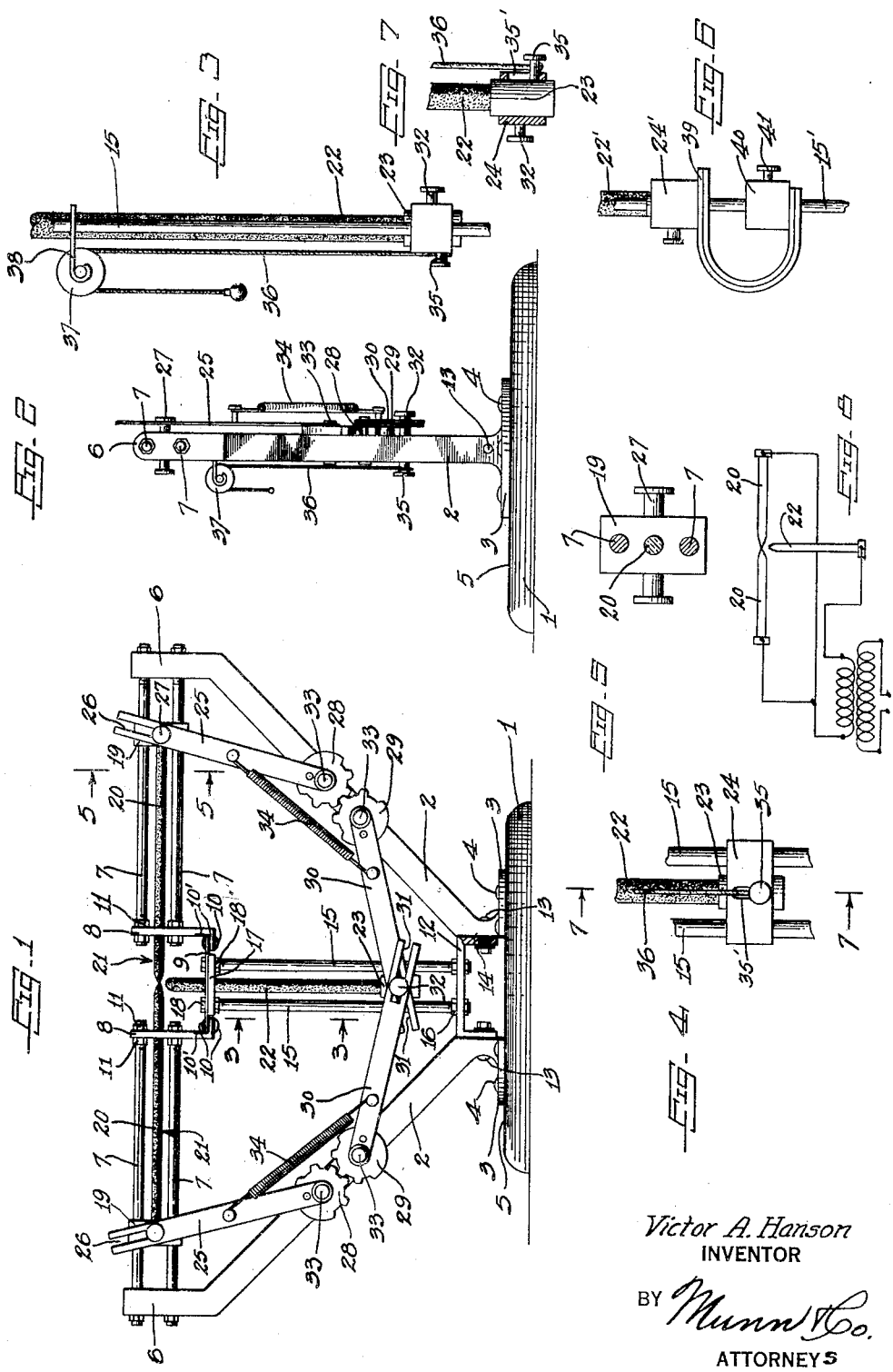
Victor A. Hanson
INVENTOR
BY Munn & Co.
ATTORNEYS Patented Oct. 11, 1932

1,882,577

UNITED STATES PATENT OFFICE

VICTOR A. HANSON, OF CHICAGO, ILLINOIS

ARC LAMP CONSTRUCTION

Application filed December 3, 1930. Serial No. 499,828.

My invention relates to improvements in arc lamp constructions, and it consists in the combinations, constructions, and arrangements herein described and claimed.

An object of my invention is to provide an arc lamp construction in which novel means is employed for controlling the feed of the electrodes in such a manner that the usual flickering of the light is entirely eliminated and in which the electrodes are positively and automatically fed for effectively maintaining the arc in a predetermined fixed position such as the focal point of the reflector which may form a part of the lamp in connection with the electrodes.

A further object is to provide a device of the type described in which one of the electrodes comprises a pair of units arranged for movement in the direction of each other and in which a second electrode of opposite polarity is arranged for movement in the direction of the other electrode, said second named electrode being arranged for having one of its ends maintained in operative relation with the contacting ends of the units comprising the first mentioned electrode. The electrodes are operatively connected together by novel means whereby the rate of feed of one of the electrodes is positively controlled and determined by the rate of oxidation or decomposition between the units comprising the electrode of the opposing polarity.

A further object is to provide a device of the type described in which the rate of feed of the electrode is determined entirely and only by the electrodes themselves whereby the necessity for solenoids, relays, motors, or manually controlled devices for feeding the electrodes is entirely eliminated.

A further object is to provide a device in which few moving parts are employed and in which the construction is such that the electrodes alone are subjected to high temperatures and in which the rate of feed on all of the electrodes is gradual and positive and automatically performed thereby insuring a uniform feed action which entirely eliminates flickering or variation in a volume of light.

A further object is to provide an arc lamp in which standard electrodes may be employed and in which the invention is designed to permit its use in connection with various types of lamp constructions such as street lamps, ultra violet ray lamps, spot lights, search lights, projectors, etc., and in which the electrodes are arranged in such a manner that the arc is exposed for permitting the radiation of a maximum amount of light.

Other objects and advantages will appear in the following specification, and the novel features of the invention will be particularly pointed out in the appended claims.

My invention is illustrated in the accompanying drawing, forming part of this application, in which Figure 1 is a view embodying my lamp construction, Figure 2 is a side elevation of the structure shown in Figure 1, Figure 3 is a fragmentary view taken along the line 3—3 of Figure 1, Figure 4 is a detail view of one of the electrode carriers, Figure 5 is a sectional view taken along the line 5—5 of Figure 1, Figure 6 is a view of a thermostatic control device for operating one of the electrodes for starting purposes, Figure 7 is a sectional view taken along the line 7—7 of Figure 4, and Figure 8 is a diagrammatic view of a suggestive circuit.

In carrying out my invention I make use of a base 1 upon which a pair of supporting arms 2 is mounted. These arms may be provided with flanges 3 for permitting the arms to be secured to the base through the medium of bolts or rivets 4. The arms 2 are insulated from the base 1 as indicated at 5. The supporting arms 2 are inclined upwardly and away from each other and are provided with end portions 6 which are preferably arranged in parallelism. These portions may be provided with openings for receiving supporting rods 7. The outer ends of the rods pass through the openings in the portion 6 while the inner ends of the rods pass through openings in members 8 which are rigidly connected with a plate 9.

The members 8 may be connected with the plate through the medium of bolts or screws 10. Suitable insulation may be provided at these points by insulating portions 10'. The inner ends of the rods may be rigidly connected with the members 8 by means of nuts 11. Thus it will be seen that the members 8 are rigidly supported in spaced-apart relation with the portion 6. While I have shown the supporting rods 7 as being connected with their associated structure by means of nuts it will be understood that other means of connection may be employed, such as welding, etc.

A supporting member 12 is positioned between the lower ends of the supporting arms 2 and may be secured thereto by means of bolts or rivets 13. The member 12 is insulated from the supporting members 2 as indicated at 14. A pair of supporting rods 15 is rigidly connected with the member 12 and the plate 9. The member 12 may be bored for receiving the rods 15 and the lower ends of the latter may be rigidly connected wtih the member 12 by means of nuts 16. The upper ends of the rods are similarly connected with the plate 9. The companion plate 17 is positioned adjacent the plate 9. Nuts 18 rigidly connect the upper ends of the rods with the plate 9.

The supporting rods 7 provide a mounting for a pair of slidable electrode supports 19. These supports may be provided with openings for receiving the rods. Each electrode carrier supports one end of a unit 20 of an electrode 21. The units in the present instance are shown as being arranged in parallelism and in point to point relation. It will be understood, however, that the units 20 may be arranged at various angles with respect to each other which of course is intended to be within the scope of the present invention.

The members 8 are provided with openings for slidably receiving the units 20. The plate 9, together with the plate 17, is also provided with an opening for receiving a second electrode 22 of opposite polarity. The lower end of this electrode is positioned within a sleeve member 23, see Figures 4 and 7, which is movably associated with an electrode carrier 24. The latter is provided with openings for receiving the supporting rods 15 and may be moved thereon as will be more clearly explained later.

In referring to Figure 1 it will be noted that the electrode 22 is positioned at right angles to the electrode 21 and its longitudinal axis is aligned with the point of contact between the adjacent ends of the units 20. The electrode 22 may, however, be positioned at various angles with respect to the electrode 21 and such modifications are also intended as within the scope of the present invention. Each of the electrode carriers 19 is provided with a lever 25. The levers 25 are preferably formed from any suitable insulating material. The ends of the lever associated with the carriers 19 are slotted at 26 for receiving connecting elements 27. The opposite ends of the levers are rigidly connected with gears 28 which are arranged in mesh with gears 29. The latter are rigidly connected with levers 30 which are operatively connected with the electrode 22 through the medium of the carrier 24. The levers 30 are also preferably formed from insulating material. An alternative construction may consist in the provision of insulating material between the gears 29 and 33 and their supporting structure, in which event the levers 25 and 30 could be formed from any ordinary metallic materials.

The ends of the levers 30 are slotted at 31 for receiving a connecting pin 32 which is carried by the carrier 24, see Figures 1, 2, and 3. The gears 28 and 29 are loosely mounted upon shaft or bearing portions 33 carried by the supporting arms 2. The levers 25 are operatively connected with the levers 30 through the medium of the gears 28 and 29 and springs 34. These springs tend to pull the levers 25 and 30 in the direction of one another. A movement of the levers in such directions will tend to move the units 20 of the electrode 21 in the direction of each other and the electrode 22 in the direction of the electrode 21.

In my description of the connections between the plate 9 and the members 8 I stated that suitable insulating portions 10' may be provided at these points of connection. The plate 9 may of course be formed from insulating material which will eliminate the necessity for the insulating elements 10'. Any suitable insulating construction whereby the plate 9 is electrically insulated from the members 8 will suffice.

Means for moving the electrode 22 independently of the levers 30 comprises a pin 35 which passes through a slot 35' in the carrier 24. The pin 35 is rigidly connected with the sleeve 23. A cord 36 is connected with the pin 35 which passes over a grooved wheel 37 which may be carried by supporting arms 38 connected with the rods 15. The arrangement is such that by pulling downwardly on the free end of the cord a movement of the sleeve in the opposite direction will result. Such movement of the sleeve lifts the electrode 22 into contact with the electrode 21. The electrode 22 drops to its normal position as soon as the cord is released. The cord permits the electrode to be manually moved into engagement with the electrode 21 for starting purposes.

The electrode 22 may be similarly moved into electrical contact with the electrode 21 by means of a thermostatic device which I have shown in Figure 6. The carrier 24' is mounted upon one end of the thermostat 39 which has its opposite end connected with a block 40 which is slidably mounted upon the rods 15'. This block is provided with a connecting bearing 41 in connection with which levers such as indicated at 30 may be associated for controlling the feed of the electrode 22' during the normal operation of the device.

The arrangement is such that the current feeding the electrode 22' passes through the thermostat. When the current is shut off the thermostat expands for holding the electrode 22' in contact with its associated electrode such as that shown at 21 in Figure 1. The thermostat moves the electrode 22' away from its associated electrode when the electrode becomes heated as when the current is turned on. In Figure 8 I have shown a suggestive wiring diagram.

In operation the device is automatic. The feed is based on the oxidation or decomposition of the electrodes themselves. The units 20 comprising the electrode 21 are of the same polarity. These units are arranged to approach each other from different directions by reason of the springs 34. The inner ends of these units are held in contact by reason of the levers 25 and the springs 34. The electrode 22 is of course of opposite polarity and is arranged to approach the contact point between the units 20. The electrode 22 is arranged to be propelled through the medium of the levers 30 and also by reason of the springs 34. It will now be seen that any movement of the opposing units 20 will cause a relative movement of the levers 20 and 30. The electrode 22 is caused to move in the direction of the electrode 21 an amount equivalent to half the length of the oxidized portions of the units 20. The electrode 22 is maintained at a constant distance from the electrode 21 and this distance is of course one which is suitable for any given case. In view of the fact that there is a gradual oxidation between the opposing units of the electrode 21, a gradual propulsion of the lower electrode in the direction of the electrode 21 is attained.

The levers 25 and 30 are preferably of equal length and the connecting gears are preferably of the same ratio. When such ratios are true the units 20 and the electrode 22 will appproach one another at the same rate of speed. The rate of oxidation of the electrodes depends upon the type of electrodes and current used. The electrodes may be arranged to approach each other from various directions other than that shown in the present instance. The general arrangement may be changed for providing a mechanical construction best suited a predetermined situation. Such changes are contemplated as being within the scope of the present invention.

I claim:

1. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, actuating arms pivotally mounted on the supporting structure and operatively connected with the complementary carbon elements, and auxiliary arms pivotally mounted on the supporting structure and operatively connected with the auxiliary carbon element, said auxiliary arms being operatively connected with the actuating arms whereby the auxiliary carbon element may be moved when the complementary carbon elements are moved.

2. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, actuating arms pivotally mounted on the supporting structure and operatively connected with the complementary carbon elements, and auxiliary arms pivotally mounted on the supporting structure and operatively connected with the auxiliary carbon element, said auxiliary arms and actuating arms being provided with toothed portions fixedly connected therewith, the toothed portions connecting with the actuating arms being in mesh with the toothed portions connected with the auxiliary arms whereby the auxiliary carbon element may be moved when the complementary carbon element is moved.

3. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, actuating arms pivotally mounted on the supporting structure and operatively connected with the complementary carbon elements, auxiliary arms pivotally mounted on the supporting structure and operatively connected with the auxiliary carbon element, said auxiliary arms being operatively connected with the actuating arms whereby the auxiliary carbon element may be moved when the complementary carbon elements are moved, and resilient means connected with the actuating arms and auxiliary arms for positively moving the auxiliary carbon element when the complementary carbon elements are moved.

4. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, actuating arms pivotally mounted on the supporting structure and operatively connected with the complementary carbon elements, auxiliary arms pivotally mounted on the supporting structure and operatively connected with the auxiliary carbon element, said auxiliary arms and actuating arms being provided with toothed portions fixedly connected therewith, the toothed portions connected with the actuating arms being in mesh with the toothed portions connected with the auxiliary arms whereby the auxiliary carbon element may be moved when the complementary carbon element is moved, and resilient means connected with the actuating arms and auxiliary arms for positively moving the auxiliary carbon element when the complementary carbon elements are moved.

5. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, block members slidably mounted on the supporting structure and connected with the carbon elements, said block members being provided with lug portions, actuating arms pivotally mounted on the supporting structure and provided with slots therein for receiving the lug portions of the block member connected with the complementary carbon elements, and auxiliary arms pivotally mounted on the supporting structure and provided with slots therein for receiving the lug portions of the block member connected with the auxiliary carbon element, said auxiliary arms being operatively connected with the actuating arms whereby the auxiliary carbon element may be moved when the complementary carbon elements are moved.

6. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, block members slidably mounted on the supporting structure and connected with the carbon elements, said block members being provided with lug portions, actuating arms pivotally mounted on the supporting structure and provided with slots therein for receiving the lug portions of the block member connected with the complementary carbon elements, and auxiliary arms pivotally mounted on the supporting structure and provided with slots therein for receiving the lug portions of the block member connected with the auxiliary carbon element, said auxiliary arms and actuating arms being provided with toothed portions fixedly connected therewith, the toothed portions connected with the actuating arms being in mesh with the toothed portions connected with the auxiliary arms whereby the auxiliary carbon element may be moved when the complementary carbon element is moved.

7. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, block members slidably mounted on the supporting structure and connected with the carbon elements, said block members being provided with lug portions, actuating arms pivotally mounted on the supporting structure and provided with slots therein for receiving the lug portions of the block member connected with the complementary carbon elements, auxiliary arms pivotally mounted on the supporting structure and provided with slots therein for receiving the lug portions of the block member connected with the auxiliary carbon element, said auxiliary arms being operatively connected with the actuating arms whereby the auxiliary carbon element may be moved when the complementary carbon elements are moved, and resilient means connected with the actuating arms and auxiliary arms for positively moving the auxiliary carbon element when the complementary carbon elements are moved.

8. An arc lamp comprising a supporting structure, a pair of complementary carbon elements slidably carried by the supporting structure and disposed in abutting relationship, an auxiliary carbon element slidably carried by the supporting structure and transversely positioned with respect to the complementary carbon elements, block members slidably mounted on the supporting structure and connected with the carbon elements, said block members being provided with lug portions, actuating arms pivotally mounted on the supporting structure and provided with slots therein for receiving the lug portions of the block member connected with the complementary carbon elements, auxiliary arms pivotally mounted on the supporting structure and provided with slots therein for receiving the lug portions of the block member connected with the auxiliary carbon element, said auxiliary arms and actuating arms being provided with toothed portions fixedly connected therewith, the toothed portions connected with the actuating arms being in mesh with the toothed portions connected with the auxiliary arms whereby the auxiliary carbon element may be moved when the complementary carbon element is moved, and resilient means connected with the actuating arms and auxiliary arms for positively moving the auxiliary carbon element when the complementary carbon elements are moved.

VICTOR A. HANSON.